United States Patent
Lotspiech et al.

(10) Patent No.: US 7,925,025 B2
(45) Date of Patent: *Apr. 12, 2011

(54) METHOD FOR BROADCAST ENCRYPTION AND KEY REVOCATION OF STATELESS RECEIVERS

(75) Inventors: Jeffrey Bruce Lotspiech, San Jose, CA (US); Dalit Naor, Palo Alto, CA (US); Simeon Naor, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 346 days.
This patent is subject to a terminal disclaimer.

(21) Appl. No.: 12/061,084

(22) Filed: Apr. 2, 2008

(65) Prior Publication Data
US 2008/0192939 A1    Aug. 14, 2008

Related U.S. Application Data

(63) Continuation of application No. 11/117,677, filed on Apr. 28, 2005, now Pat. No. 7,698,551, which is a continuation of application No. 09/770,877, filed on Jan. 26, 2001, now Pat. No. 7,039,803.

(51) Int. Cl.
*H04L 9/00* (2006.01)
*H04L 9/08* (2006.01)
*G06F 7/04* (2006.01)
*H04N 7/16* (2011.01)

(52) U.S. Cl. ......... 380/278; 380/277; 380/279; 380/44; 380/45; 713/162; 713/163; 713/189; 713/193; 726/26; 726/27; 726/28; 726/29; 726/30

(58) Field of Classification Search .......... 713/162–163, 713/193, 189; 380/277–279, 44–45; 726/26–30
See application file for complete search history.

(56) References Cited

U.S. PATENT DOCUMENTS

| | | | | |
|---|---|---|---|---|
| 5,592,552 A * | 1/1997 | Fiat | ............... | 713/163 |
| 5,748,736 A | 5/1998 | Mittra | | |
| 6,118,873 A | 9/2000 | Lotspiech et al. | | |
| 6,222,923 B1 * | 4/2001 | Schwenk | ........ | 380/44 |
| 6,397,329 B1 * | 5/2002 | Aiello et al. | ......... | 713/155 |
| 6,560,340 B1 * | 5/2003 | Akins et al. | ......... | 380/239 |
| 6,636,968 B1 * | 10/2003 | Rosner et al. | ........ | 713/178 |
| 6,684,331 B1 * | 1/2004 | Srivastava | ........ | 713/163 |
| 6,775,382 B1 * | 8/2004 | Al-Salqan | ........ | 380/286 |
| 6,782,475 B1 * | 8/2004 | Sumner | ........ | 713/163 |
| 2004/0202328 A1 * | 10/2004 | Hara | ........ | 380/270 |

* cited by examiner

Primary Examiner — Taghi T. Arani
Assistant Examiner — Madhuri Herzog
(74) Attorney, Agent, or Firm — John L. Rogitz

(57) ABSTRACT

A tree is used to partition stateless receivers in a broadcast content encryption system into subsets. Two different methods of partitioning are disclosed. When a set of revoked receivers is identified, the revoked receivers define a relatively small cover of the non-revoked receivers by disjoint subsets. Subset keys associated with the subsets are then used to encrypt a session key that in turn is used to encrypt the broadcast content. Only non-revoked receivers can decrypt the session key and, hence, the content.

49 Claims, 8 Drawing Sheets

OVERALL FLOW - INITIALIZATION AND ENCRYPTION

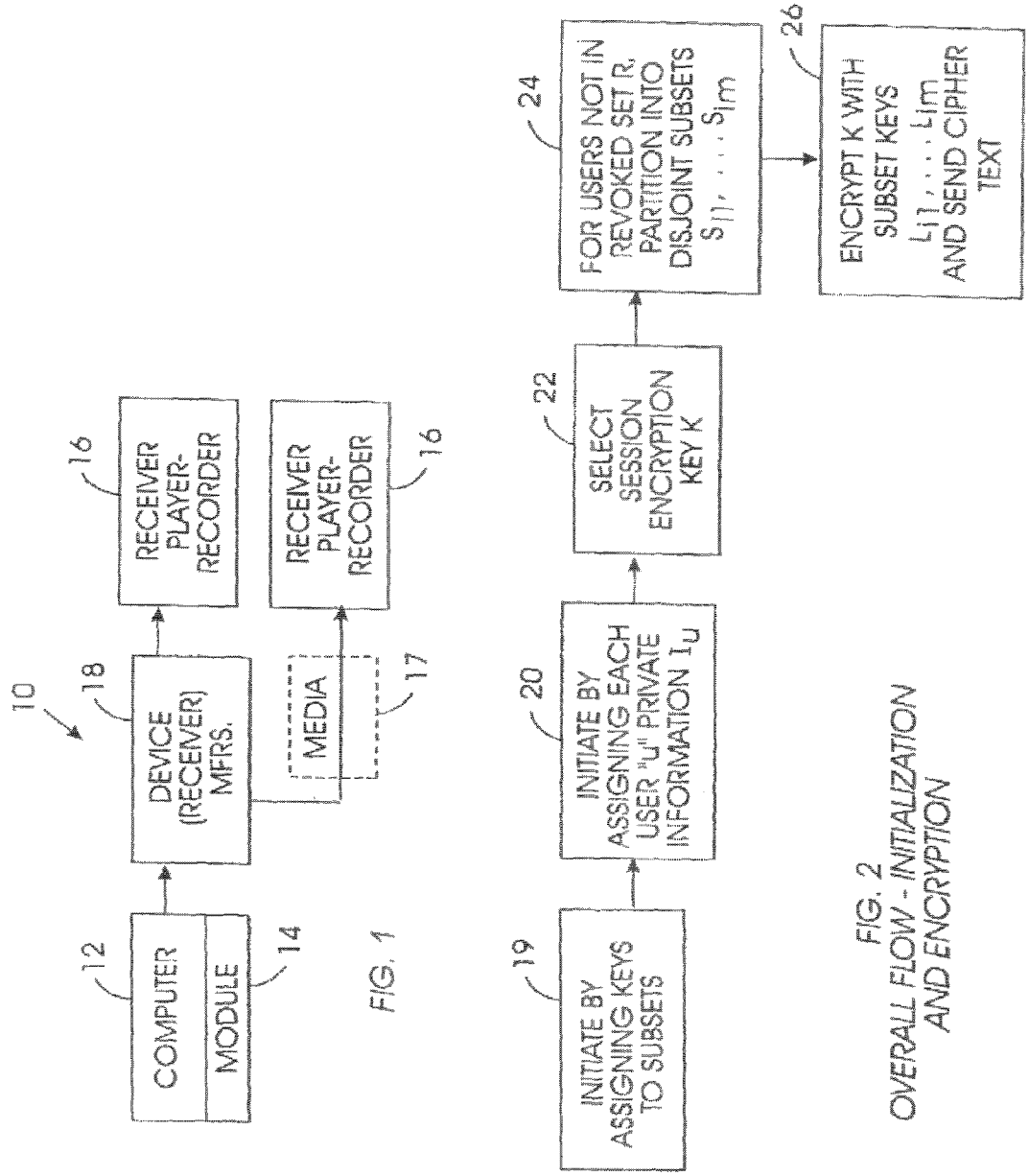

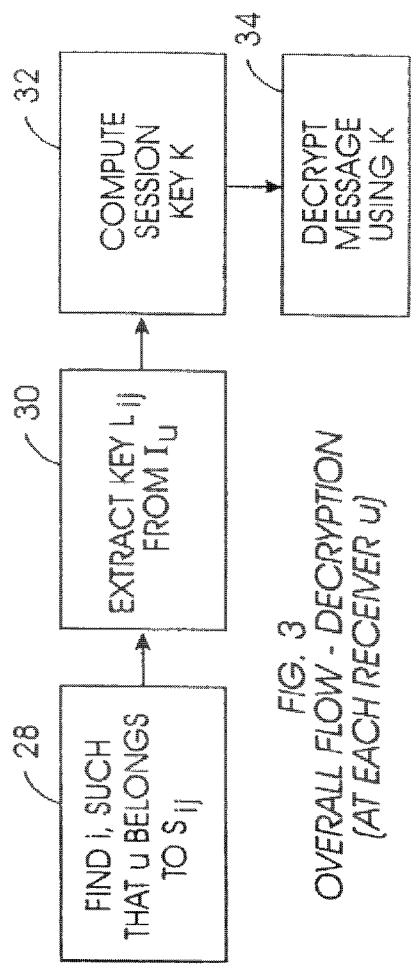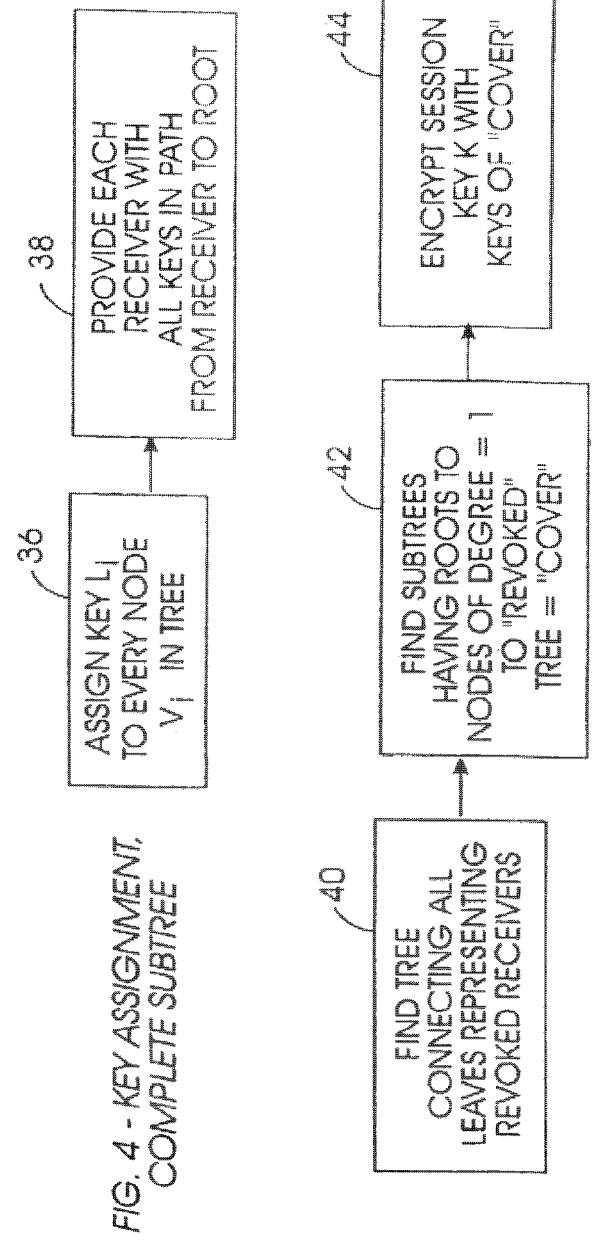
FIG. 3
OVERALL FLOW - DECRYPTION
(AT EACH RECEIVER u)
FIG. 4 - KEY ASSIGNMENT, COMPLETE SUBTREE
FIG. 5 - COMPLETE SUBTREE ENCRYPTION USING "COVER"

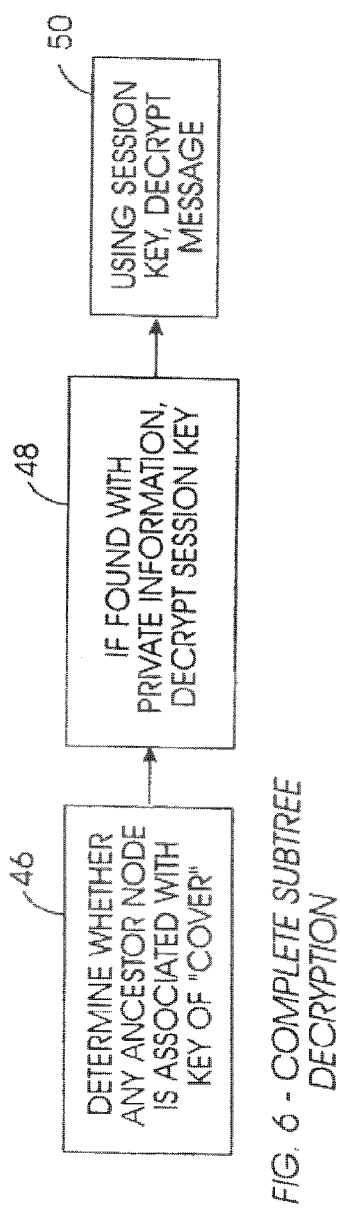
FIG. 6 - COMPLETE SUBTREE DECRYPTION
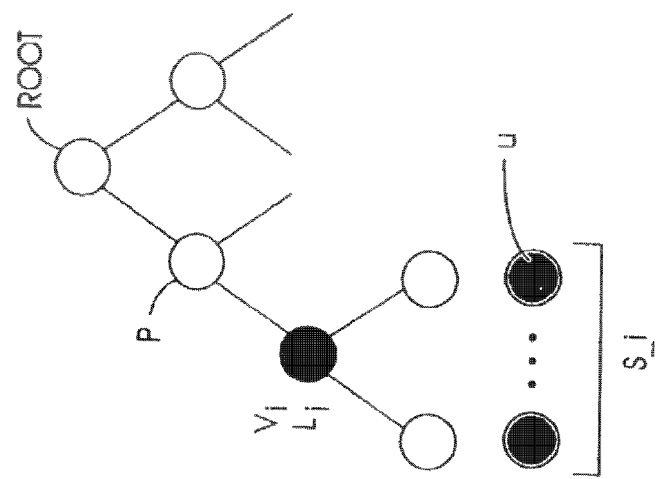
FIG. 7 - COMPLETE SUBTREE

DEFINING COVER-SUBSET
DIFFERENCE

FIG. 11 - KEY ASSIGNMENT IN SUBSET DIFFERENCE METHOD

DECRYPTION, SUBSET DIFFERENCE

KEY ASSIGNMENT - SUBSET DIFFERENCE

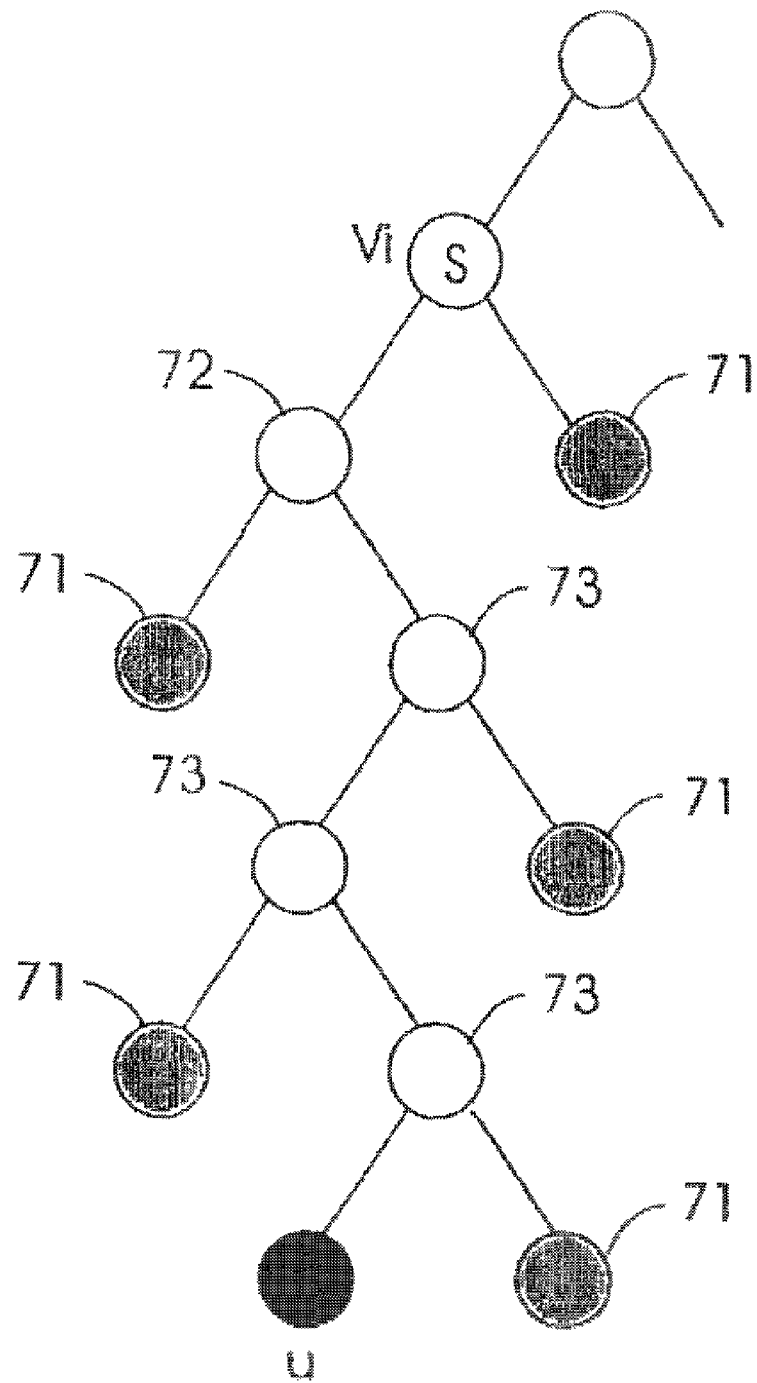
FIG. 14 - ASSIGNMENT OF LABELS SUBSET DIFFERENCE METHOD

METHOD FOR BROADCAST ENCRYPTION AND KEY REVOCATION OF STATELESS RECEIVERS

This is a continuation of U.S. patent application Ser. No. 11/117,677, filed Apr. 28, 2005, now U.S. Pat. No. 7,698,551, which is a continuation of Ser. No. 09/770,877, filed Jan. 26, 2001, now U.S. Pat. No. 7,039,803. Priority is claimed to both of the above patents.

BACKGROUND OF THE INVENTION

1. Field of the Invention

The present invention relates generally to broadcast data encryption that uses encryption keys.

2. Description of the Related Art

U.S. Pat. No. 6,118,873, incorporated herein by reference, discloses a system for encrypting broadcast music, videos, and other content. As set forth therein, only authorized player-recorders can play and/or copy the content and only in accordance with rules established by the vendor of the content. In this way, pirated copies of content, which currently cost content providers billions of dollars each year, can be prevented.

In the encryption method disclosed in the above-referenced patent, authorized player-recorders are issued software-implemented device keys from a matrix of device keys. The keys can be issued simultaneously with each other or over time, but in any event, no player-recorder is supposed to have more than one device key per column of the matrix. Although two devices might share the same key from the same column, the chances that any two devices share exactly the same set keys from all the columns of the matrix are very small when keys are randomly assigned. The keys are used to decrypt content.

In the event that a device (and its keys) becomes compromised, deliberately or by mistake, it is necessary to revoke the keys of that device. Revoking a set of keys effectively renders the compromised device (and any clones thereof) inoperable to play content that is produced after the revocation. In the above-disclosed patent, for each revocation about 320 message bytes are required. The present invention understands that while this is effective, it is desirable to reduce the length of the revocation message even further, for efficiency.

While the system disclosed in the above-referenced patent is effective, the present invention recognizes that owing to size constraints of the header area of the message (referred to as "media key block" in the patent), only a relatively limited (10,000 for a 3M header such as DVD-Audio) number of revocations can be made during the life of the system. This number can be increased by increasing the header size, but the added revocations would be applicable only to newly made devices, and not to devices that were made before the header size increase. The present invention understands that it is desirable to be able to execute a large number of revocations of both "old" and "new" devices, i.e., to account for stateless receivers. Also, since more than one device can share any particular key with the compromised device in the above-referenced patented invention, revoking a set of device keys might result in revoking some keys held by innocent devices. As understood by the present invention it is desirable to further reduce the chances of accidentally revoking a "good" device, preferably to zero.

Moreover, the present invention is directed to the difficult scenario of "stateless" receivers, i.e., receivers that do not necessarily update their encryption state between broadcasts to accept countermeasures against compromised devices. For example, a television that subscribes to a pay channel might have its set-top box deenergized for a period of time during which updated encryption data might be broadcast over the system. Such a device would be rendered "stateless" if it happens to be unable to update itself after being reenergized, and would thus not possess updates that would be necessary for future content decryption.

In addition, there is a growing need for protecting the content of media, such as CDs and DVDs, that is sold to the public and for which it is desirable to prevent unauthorized copying. The recorders in such a system ordinarily do not interact with the players, and no player will get every possible piece of encryption data updates, since no player receives every vended disk. Consequently, as understood herein, content protection of vended media is an example of the problem of broadcast encryption to stateless receivers.

Moreover, the present invention recognizes that the presence of more than a few "evil" manufacturers (i.e., manufacturers who legally or illegally obtain keys but who in any case make many unauthorized devices having the keys) can be problematic. The present invention recognizes the desirability of accounting for potentially many "evil" manufacturers.

Other methods for broadcast encryption include those disclosed in Fiat et al., *Broadcast Encryption*, Crypto '93, LNCS vol. 839, pp. 257-270 (1994). This method envisions removing any number of receivers as long as at most "t" of them collude with each other. However, the Fiat et al. method requires relatively large message lengths, a relatively large number of keys be stored at the receiver, and each receiver must perform more than a single decryption operation. Furthermore, the Fiat et al. method does not envision the stateless receiver scenario. The present invention recognizes the need to avoid assuming a priori how many receivers might collude. Also, the present invention recognizes that the message size and number of stored keys be minimized, and that the number of decryption operations that must be performed by a receiver be minimized, to optimize performance.

Other encryption systems, like the Fiat et al. system, do not provide for the scenario of stateless receivers, and thus cannot effectively be applied as is to content protection of recorded media. Examples of such systems include the tree-based logical key hierarchy systems disclosed in Wallner et al., *Key Management for Multicast: Issues and Architectures*, IETF draft wallner-key, 1997; Wong et al., *Secure Group Communication Using Key Graphs*, SIGCOMM 1998; Canetti et al., *Multicast Security: A Taxonomy and Some Efficient Constructions*, Proc. of INFOCOM '99, vol. 2, pp. 708-716 (1999); Canetti et al., *Efficient Communication-Storage Tradeoffs for Multicast Encryption*, Eurocrypt 1999, pp. 459-474; and McGrew et al., *Key Establishment in Large Dynamic Groups Using One-Way Function Trees*, submitted to IEEE Transactions on Software Engineering (1998).

With more specificity regarding the methods of Wallner et al. and Wong et al., keys are assigned by assigning an independent label to each node in a binary tree. Unfortunately, in the referenced methods some of the labels change at every revocation. Clearly, as is, the method would be inappropriate for the stateless receiver scenario. Even were a batch of revocations to be associated with a single label change for every node, the referenced methods of Wallner et al. and Wong et al., as understood by the present invention, would require at least log N decryptions at the receiver and the transmission of rlogN encryptions (wherein r is the number of devices to be revoked and N is the total number of receivers in the system), unfortunately a relatively high number. The present invention has made the critical observations noted above and has provided the below solutions to one or more of the observations.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

A method is disclosed for grouping users into (possibly overlapping) subsets of users, each subset having a unique, preferably long-lived subset key, and assigning each user respective private information $I_u$. The method also includes selecting at least one preferably short-lived session encryption key K, and partitioning users not in a revoked set R into disjoint subsets $S_{i1}, \ldots S_{im}$ having associated subset keys $L_{i1}, \ldots L_{im}$. The session key K is encrypted with the subset keys $L_{i1}, \ldots L_{im}$ to render m encrypted versions of the session key K. In one aspect, the users can establish leaves in a tree such as a complete binary tree, and the subsets $S_{i1}, \ldots S_{im}$ are induced by the tree.

In a preferred embodiment, the users are initially partitioned into groups $S_1, \ldots, S_w$, wherein "w" is an integer. A given transmission selects m such groups as a "cover" for non-revoked users, with the cover being defined by the set of revoked users. The "cover" groups establish subtrees (either complete subtrees or a difference between two subtrees) in a tree. A user's private information $I_u$ is preferably found as information $i_j$ in a transmitted message that indicates that a user belongs to a subset $S_{ij}$ of one of the groups $S_1, \ldots, S_w$. A subset key $L_{ij}$ can then be obtained from or derived using the private information of the user.

In a first embodiment, referred to herein as the "complete subtree" method, respective groups correspond to all possible subtrees in the complete tree. Each user is assigned keys from all nodes that are in a direct path between a leaf representing the user and the root of the tree. In other words, each subset $S_i$ includes all leaves in a subtree rooted at some node $v_i$, with at least each node in the subtree being associated with a respective subset key. In this embodiment, content is provided to users in a message defining a header, and the header includes at most r*log(N/r) subset keys and encryptions, wherein r is the number of users in the revoked set R and N is the total number of users. Moreover, each user must store log N keys, and each user processes the message using at most tog log N operations plus a single decryption operation.

In a second embodiment, referred to herein as the "subset difference" method, respective groups of users correspond to a universe of sets $S_1, \ldots, S_w$ that can be described as "a first subtree A minus a second subtree B that is entirely contained in A". Each node in this tree has a set of labels, one unique to the node and others that are induced by ancestor nodes. Each user is assigned labels from all nodes hanging from nodes in a direct path between the receiver and the root (at most logN labels from each such node), but not from nodes in the direct path itself. In other words, each subset includes all leaves in a subtree rooted at some node $v_i$ that are not in the subtree rooted at some other node $v_j$ that descends from $v_i$. One of the labels of the subset difference nodes for a particular user are provided to the user in a transmission as that user's private information. Using the labels, the user can generate the subset keys necessary for decryption.

In this embodiment, the message header includes at most 2r−1 (1.25r on average) subset keys and encryptions, each user must store $0.5 \log^2 N + 0.5 \log N + 1$ keys, and each user processes the message using at most log N operations (preferably applications of a pseudorandom generator) plus a single decryption operation.

As disclosed further below with respect to the subset difference method, the revoked set R defines a spanning tree. A cover tree T is initialized as the spanning tree, and then the method iteratively removes nodes from the cover tree T and adds subtrees to the cover tree T until the cover tree T has at most one node. The cover tree T is used to identify subset keys to be used in a particular transmission, with users evaluating the pseudorandom sequence generator to derive subset keys from the labels. Preferably, for processing efficiency revocations are processed in order from left to right such that only two revocations at a time must be kept in memory.

In some specific implementations, the message header includes a cryptographic function $E_L$, and the method includes prefix-truncating the cryptographic prefix function $E_L$. If desired, portions of the message can be encrypted with respective session keys.

In another aspect, a computer program device includes a computer program storage device that in turn includes a program of instructions that can be used by a computer. The program includes logic means for accessing a tree to obtain plural subset keys, and logic means for encrypting a message with a session key. Logic means are also provided for encrypting the session key at least once with each of the subset keys to render encrypted versions of the session key. Then, logic means send the encrypted versions of the session key in a header of the message to plural stateless receivers.

In yet another aspect, a computer is programmed with instructions to cause the computer to encrypt broadcast content, and send the broadcast content to plural stateless good receivers and to at least one revoked receiver such that each stateless good receiver can decrypt the content and the revoked receiver cannot decrypt the content.

In another aspect, a potentially stateless receiver u in a broadcast encryption system includes a data storage storing respective private information $I_u$, and a processing device that receives a session encryption key K which is encrypted with plural subset keys. The session key encrypts content, with the processing device obtaining at least one subset key using the private information such that the session key K can be decrypted to play the content. In a preferred embodiment, the receiver is partitioned into one of a set of groups $S_1, \ldots, S_w$, wherein "w" is an integer, and the groups establish subtrees in a tree. Subsets $S_{i1}, \ldots, S_{im}$ derived from the set of groups $S_1, \ldots, S_w$ define a cover that is calculated by the receiver or by a system computer. Preferably, the tree includes a root and plural nodes, with each node having at least one associated label. Each subset includes all leaves in a subtree rooted at some node $v_i$ that are not in the subtree rooted at some other node $v_j$ that descends from $v_i$.

In another aspect, a medium holds a message of content of the general form $<[i_1, i_2, \ldots, i_m, E_{Li1}(K), E_{Li2}(K), \ldots, E_{Lim}(K)], F_K(M) >$, wherein K is a session key, $F_K$ is an encryption primitive, $E_K$ is an encryption primitive, $L_i$ are subset keys associated with subsets of receivers in an encryption broadcast system, M is a message body, and $i_1, i_2, \ldots, i_m$ are tree node subsets defining a cover.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;

FIG. 2 is a flow chart of the overall encryption logic;

FIG. 3 is a flow chart of the overall decryption logic;

FIG. 4 is a flow chart of the key assignment portion of the complete subtree method;

FIG. 5 is a flow chart of the encryption portion of the complete subtree method;

FIG. 6 is a flow chart of the decryption portion of the complete subtree method;

FIG. 7 is a schematic diagram of a subset of a complete subtree;

FIG. 14 is a schematic diagram of a subset of a tree in the subset difference method.

DETAILED DESCRIPTION OF THE PREFERRED EMBODIMENTS

Figure 9:
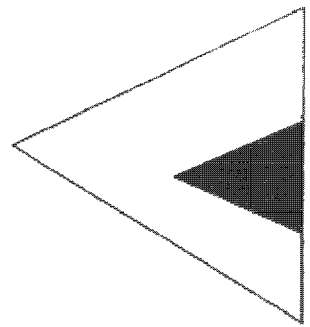
FIG. 9 is another form of a schematic diagram of the subset in the subset difference method.

Referring initially to FIG. 1, a system is shown, generally designated 10, for generating sets of keys in a broadcast content guard system, such as but not limited to the system disclosed in the above-referenced patent. By "broadcast" is meant the wide dissemination of a program from a content provider to many users simultaneously over cable (from a satellite source), or wire, or radiofrequency (including from a satellite source), or from widely marketed content disks.

As shown, the system 10 includes a key set definition computer 12 that accesses a key set definition module 14 that functions in accordance with disclosure below. The key sets defined by the computer 12 are used by potentially stateless player-recorder devices 16, also referred to herein as "receivers" and "users", that have processors inside them to decrypt content. The content along with certain keys disclosed below are provided to the respective devices via, e.g., device manufacturers 16 on media 17. A player-recorder device can access its key set to decrypt the content on media or broadcast to it via wireless communication. As used herein "media" can include but is not limited to DVDs, CDs, hard disk drives, and flash memory devices. In an alternative embodiment, each receiver 16 could execute the module 14 to undertake the step of calculating the below-disclosed "cover" by being given the set of revoked receivers and undertaking the logic set forth below.

It is to be understood that the processor associated with the module 14 accesses the modules to undertake the logic shown and discussed below, which may be executed by a processor as a series of computer-executable instructions. Two methods—the complete subtree method, and the subset difference method—are disclosed herein for using the system 10 to selectively revoke the ability of compromised receivers 16 to decrypt broadcast content without revoking the ability of any non-compromised receiver 16 to decrypt broadcast content.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device or other appropriate data storage device. In an illustrative embodiment of the invention, the computer-executable instructions may be lines of compiled $C^{++}$ compatible code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

The overall logic of the present invention as embodied by both the subset difference method and complete subtree method can be seen in reference to FIG. 2. For purposes of the present disclosure, assume that N receivers 16 exist in the system 10, and that it is desirable to be able to revoke the ability of r receivers in a revoked receiver subset R to decrypt content even if the revoked receivers act in a coalition (by sharing encryption knowledge), such that any receiver can still decrypt content. Commencing at block 19, the system is initiated by assigning long-lived subset keys $L_1, \ldots, L_w$ to corresponding subsets in a universe of subsets $S_1, \ldots, S_w$ into which receivers are grouped in accordance with the disclosure below, with each subset $S_j$ thus having a long-lived subset key $L_j$ associated with it. In the first ("complete subtree") method, the subsets covering receivers not in a revoked set are simply the subtrees that are generated per the disclosure below. In the second ("subset difference") method, the subsets covering receivers not in a revoked set are defined by the difference between a first subtree and a smaller subtree that is entirely within the first subtree as set forth further below.

At block 20, the system is further initiated by supplying each receiver u with private information $I_u$ that is useful for decrypting content. Details of the private information $I_u$ are set forth further below. If $I_u$ is the secret information provided to receiver u, then each receiver u in $S_j$ can deduce $L_j$ from its $I_u$. As set forth more fully below, given the revoked set R, the non-revoked receivers are partitioned into m disjoint subsets $S_{i1}, \ldots, S_{im}$ and a short-lived session key K is encrypted m times with the long-lived subset keys $L_{i1}, \ldots, L_{im}$ associated with respective subsets $S_{i1}, \ldots, S_{im}$. The subset keys are explicit subset keys in the complete subtree method and are induced by subset labels in the subset difference method.

Specifically, at block 22 at least one session key K is selected with which to encrypt content that is broadcast in a message M, either via wireless or wired communication paths or via storage media such as CDs and DVDs. The session key K is a random string of bits that is selected anew for each message. If desired, plural session keys can be used to encrypt respective portions of the message M.

In both of the below-described methods, non-revoked receivers are partitioned into disjoint subsets $S_{i1}, \ldots S_{im}$ at block 24 using a tree. The subsets are sometimes referred to herein as "subtrees", with the first method explicitly considering subtrees and the second method regarding subtrees as being of the form "a first subtree minus a second subtree entirely contained in the first". Each subset $S_{i1}, \ldots, S_{im}$ is associated with a respective subset key $L_{i1}, \ldots, L_{im}$. While any data tree-like structure is contemplated herein, for disclosure purposes it is assumed that the tree is a full binary tree.

Proceeding to block 26, in general the session key K is encrypted m times, once with each subset key $L_{i1}, \ldots, L_{im}$. The resulting ciphertext that is broadcast can be represented as follows, with portions between the brackets representing the header of the message M and with is $i_1, i_2, \ldots, i_m$ representing indices of the disjoint subsets:

$<[i_1, i_2, \ldots, E_{Li1}(K), E_{Li2}(K), \ldots, E_{Lim}(K)], F_K(M)>$

In one embodiment, the encryption primitive $F_K$ is implemented by XORing the message M with a stream cipher generated by the session key K. The encryption primitive $E_L$ is a method for delivering the session key K to the receivers 16, using the long-lived subset keys. It is to be understood that all encryption algorithms for $F_K$, $E_L$ are within the scope of the present invention. One preferred implementation of $E_L$ can be a Prefix-Truncation specification of a block cipher. Assume ⊗ represents a random string whose length equals the block length of $E_L$, and assume that K is a short key for the cipher $F_K$ whose length is, e.g., 56 bits. Then, $[\text{Prefix}_{|K|}E_L(\otimes)\oplus K]$ provides a strong encryption. Accordingly, the Prefix-Truncated header becomes:

$<[i_1, i_2, \ldots, i_m, U, [\text{Prefix}_{|K|}E_{Li1}(U)]\oplus K, \ldots, [\text{Prefix}_{|K|}E_{Lim}(U)]\oplus K], F_K(M)>$ This advantageously reduces the length of the header to about m|K| bits instead of m|L|. In the case where the key length of $E_L$ is minimal, the following can be used to remove the factor m advantage that an adversary has in a brute-force attack which results from encrypting the same string ⊗ with m different keys. The string ⊗ ⊕$i_j$ is encrypted. That is, $<[i_1, i_2, \ldots, i_m, U, [\text{Prefix}_{|L|}E_{Li1}(U\oplus i_1)]\oplus K, \ldots, [\text{Prefix}_{|L|}E_{Lim}(U\oplus i_m)]\oplus K], F_K(M)>$ Having described preferred, non-limiting ways to implement the encryption primitives E and F, attention is now directed to FIG. 3, which shows the decryption logic undertaken by the receivers 16. Commencing at block 28, each non-revoked receiver u finds a subset identifier $i_j$ in the ciphertext such that it belongs to the subset $S_{ij}$. As disclosed further below, if the receiver is in the revoked set R, the result of block 28 will be null. Next, at block 30 the receiver extracts the subset key $L_{ij}$ corresponding to the subset $S_{ij}$ using its private information $I_u$. Using the subset key, the session key K is determined at block 32, and then the message decrypted at block 34 using the session key K.

Two preferred methods for undertaking the above-described overall logic are disclosed below. In each, the collection of subsets is specified, as is the way keys are assigned to the subsets and a method to cover non-revoked receivers using disjoint subsets from the collection. In each, the set of receivers in the system establishes the leaves of a tree, such as but not limited to a full binary tree.

The first method to be discussed is the complete subtree method shown in FIGS. 4-7. Commencing at block 36 in FIG. 4, an independent and random subset key $L_i$ is assigned to each node $v_i$ in the tree. This subset key $L_i$ corresponds to a subset containing all leaves rooted at node $v_i$. Then, at block 38 each receiver u is provided with all subset keys in the direct path from the receiver to the root. As illustrated in brief reference to FIG. 7, the receivers u in the subset $S_i$ are provided with the subset key $L_i$ associated with the node $v_i$, as well as with the keys associated with the node P, which lies between the receivers in $S_i$ and the root of the tree.

When it is desired to send a message and revoke the ability of some receivers from decrypting the message, the logic of FIG. 5 is invoked to partition non-revoked receivers into disjoint subsets. Commencing at block 40, a spanning tree is discovered that is defined by the leaves in R, the set of revoked receivers. The spanning tree is the minimal subtree of the full binary tree that connects the "revoked"[9] leaves, and it can be a Steiner tree. Proceeding to block 42, the subtrees that have roots adjacent to nodes of degree one in the tree (i.e., nodes that are directly adjacent to the minimal tree) are identified. These subtrees define a "cover" and establish the subsets $S_{i1}, \ldots, S_{im}$. The cover encompasses all non-revoked receivers. Accordingly, at block 44 the session key K is encrypted using the subsets keys defined by the cover.

To decrypt the message, each receiver invokes the logic of FIG. 6. Commencing at block 46, it is determined whether any ancestor node of the receiver is associated with a subset key of the cover by determining whether any ancestor node is among the set $i_1, i_2, \ldots, i_m$ in the message header. The receiver's private information $I_u$, which in the complete subtree method consists of its position in the tree and subset keys associated with ancestor nodes, is used to determine this. If an ancestor is found in the message header (indicating that the receiver is a non-revoked receiver), the session key K is decrypted at block 48 using the subset key, and then the message is decrypted using the session key K at block 50.

In the complete subtree method, the header includes at most r*log(N/r) subset keys and encryptions. This is also the average number of keys and encryptions. Moreover, each receiver roust store log N keys, and each receiver processes the message using at most log log N operations plus a single decryption operation.

Now referring to FIGS. 8-13, the subset difference method for revoking receivers can be seen. In the subset difference method, each receiver must store relatively more keys (0.5 $\log^2 N + 0.5$ log N+1 keys) than in the complete subtree method, but the message header includes only at most 2r−1 subset keys and encryptions (1.25r on average), and this is substantially shorter than in the complete subtree method. Also, in the subset difference method the message is processed using at most log N applications of a pseudorandom number generator plus a single decryption operation.

Figure 8:
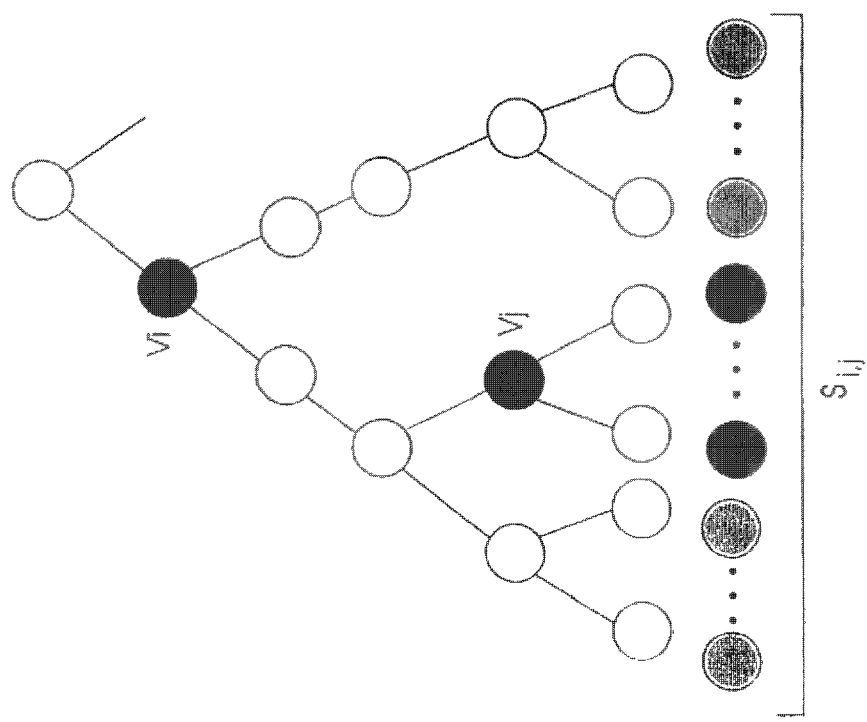
FIG. 8 is a schematic diagram of a subset in the subset difference method.

Referring FIGS. 8 and 9, the subset difference method regards subsets as being the difference between a larger subset A and a smaller subset B that is entirely contained in A. Accordingly, as shown a larger subtree is rooted at node $v_i$ and a smaller subtree is rooted at node $v_j$ that descends from $v_i$. The resulting subset $S_{ij}$ consists of all the leaves "yes" under $v_i$ except for those leaves labelled "no" (and colored more darkly than the leaves labelled "yes") under $v_j$. FIG. 9 illustrates this, with the subset $v_{ij}$ being represented by the area within the larger triangle and outside the smaller triangle.

Figure 10:
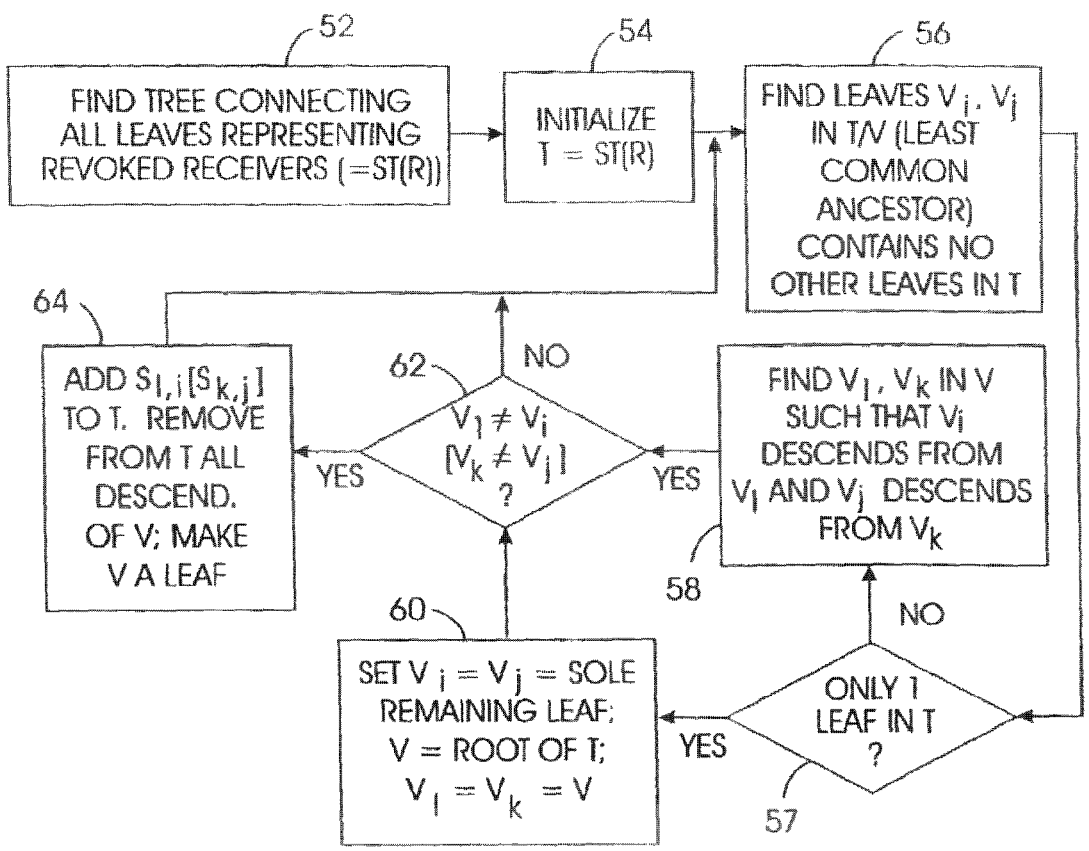
FIG. 10 is a flow chart of the logic for defining a cover in the subset difference method.

When it is desired to send a message and revoke the ability of some receivers from decrypting the message in the subset difference method, the above-described structure is used as shown in FIG. 10. Commencing at block 52, a spanning tree is discovered that is defined by the leaves in R, the set of revoked receivers. The spanning tree is the minimal subtree of the full binary tree that connects the "revoked" leaves, and it can be a Steiner tree. Proceeding to block 54, a cover tree T is initialized as the spanning tree. An iterative loop then begins wherein nodes are removed from the cover tree and subtrees are added to the cover until the cover tree T has at most one node. The output defines the cover for the non-revoked receivers.

More specifically, moving from block 54 to block 56, leaves $v_i$ and $v_j$ are found in the cover tree T such that their least common ancestor v contains no other leaves in T. At decision diamond 57 it is determined whether only one leaf exists in the cover tree T. If more than a single leaf exists, the logic moves to block 58 to find nodes $v_1, v_k$ in v such that $v_i$ descends from $v_1$ and $v_j$ descends from $v_k$ and such that $v_1, v_k$ are children of v (i.e., are direct descendants of v without any intervening nodes between v and $v_1, v_k$). In contrast, when only a single leaf exists in T, the logic moves from decision diamond 57 to block 60 to set $v_i=v_j=$sole remaining leaf, place v at the root of T, and set $v_1=v_k=$root.

From block 58 or 60 the logic moves to decision diamond 62. At decision diamond 62, it is determined whether $v_1$ equals $v_i$. It is likewise determined whether $v_k$ equals $v_j$. If $v_i$ does not equal $v_i$ the logic moves to block 64 to add the subset $S_{1,i}$ to T, remove from T all descendants of v, and make v a leaf. Likewise, if $v_k$ does not equal $v_j$ the logic moves to block 64 to add the subset $S_{k,j}$ to T, remove from T all descendants of v, and make v a leaf. From block 64 or from decision diamond 62 when no inequality is determined, the logic loops back to block 56.

Figure 11:
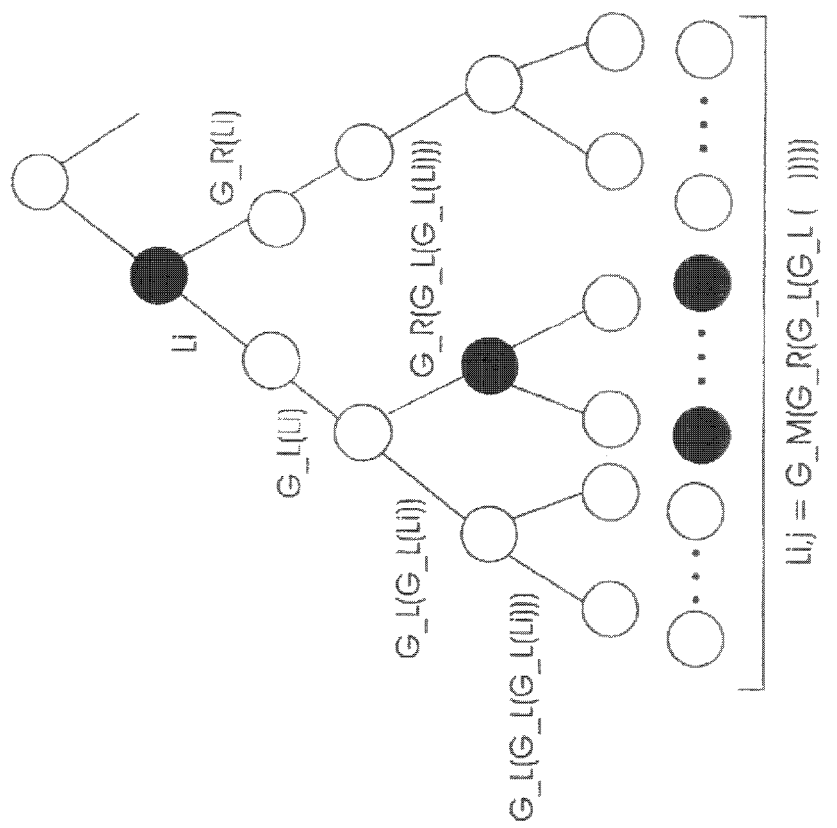
FIG. 11 is a schematic diagram of a subset of a tree in the subset difference method, illustrating key assignment.

With the above overall view of the subset difference key assignment method in mind, a particularly preferred implementation is now set forth. While the total number of subsets to which a receiver belongs is as large as N, these subsets can be grouped into logN clusters defined by the first subset i (from which another subset is subtracted). For each 1<i<N corresponding to an internal node in the full tree, an independent and random label $LABEL_i$ is selected, which induces the labels for all legitimate subsets of the form $S_{i,j}$. From the labels, the subset keys are derived. FIG. 11 illustrates the preferred labelling method discussed below. The node labelled $L_j$ is the root of the subtree $T_j$, and its descendants are labelled according to present principles.

If G is a cryptographic pseudorandom sequence generator that triples the input length, G_L(S) denotes the third left of the output of G on the seed S, G_R(S) denotes the right third, and G_M(S) denotes the middle third. Consider the subtree $T_i$ of the cover tree T rooted at the node $v_i$ with label $LABEL_i$. If this node is labelled S, its two children are labelled G_L(S) and G_R(S) respectively. The subset key $L_{i,j}$ assigned to the set $S_{i,j}$ is the G_M of the label of $LABEL_{i,j}$ of node $v_j$ derived in the subtree $T_i$. Note that each label S induces three parts, namely, the labels for the left and right children, and the key of the node. Consequently, given the label of a node it is possible to compute the labels and keys of all its descendants. In one preferred embodiment, the function G is a cryptographic hash such as the Secure Hashing Algorithm-1, although other functions can be used.

Figure 12:
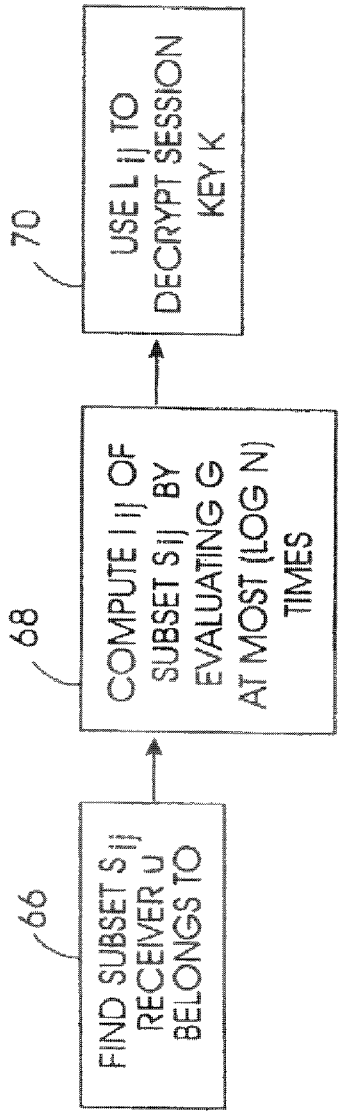
FIG. 12 is a flow chart of the decryption portion of the subset difference method.

FIG. 12 shows how receivers decrypt messages in the subset difference method. Commencing at block 66, the receiver finds the subset $S_{i,j}$ to which it belongs, along with the associated label (which is part of the private information of the receiver that allows it to derive the $LABEL_{i,j}$ and the subset key $L_{i,j}$). Using the label, the receiver computes the subset key $L_{i,j}$ by evaluating the function G at most N times at block 68. Then, the receiver uses the subset key to decrypt the session key K at block 70 for subsequent message decryption.

Figure 13:
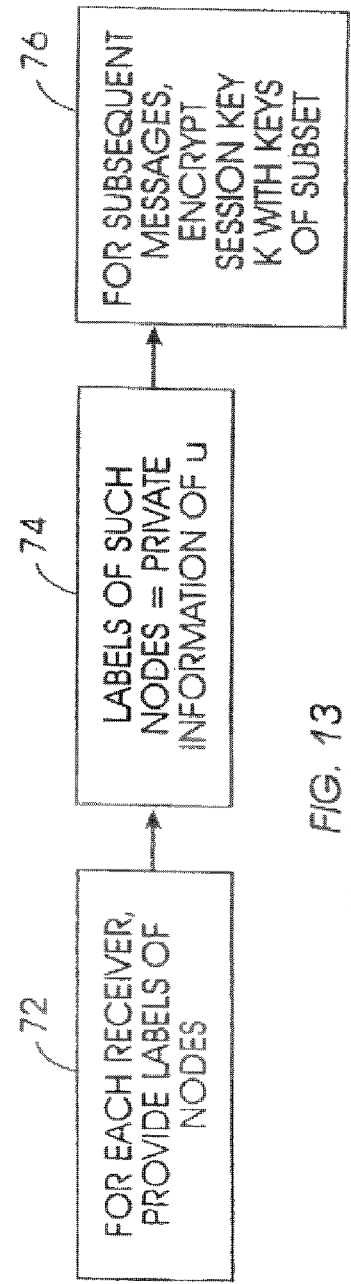
FIG. 13 is a flow chart of the logic for assigning keys in the subset difference method.

FIG. 13 shows how labels and, hence, subset keys, are assigned to receivers in the subset difference method. The labelling method disclosed herein is used to minimize the number of keys that each receiver must store.

Commencing at block 72, each receiver is provided with labels of nodes that are not in the direct path between the receiver and the root but that "hang" off the direct path and that are induced by some node $v_i$, an ancestor of u. These labels establish the private information $I_u$ of the receiver at block 74, with subsequent message session keys being encrypted with subset keys derived from the labels at block 76.

Referring briefly to FIG. 14, the above principle is illustrated. For every $v_i$ ancestor with label S of a receiver u, the receiver u receives labels at all nodes 71 that are hanging off the direct path from the node $v_i$ to the receiver u. As discussed further below, these labels are preferably all derived from S. In marked contrast to the complete subtree method, in the subset difference method illustrated in FIGS. 8-14 the receiver u does not receive labels from any node 73 that is in the direct path from the receiver u to the node $v_i$. Using the labels, the receiver u can compute the subset keys of all sets (except the direct path set) that are rooted at the node $v_i$ by evaluating the above-described function G, but can compute no other subset keys.

Conventional multicast systems lack backward secrecy, i.e., a constantly listening receiver that has been revoked nonetheless can record all encrypted content and then sometime in the future gain a valid new key (by, e.g., re-registering) which allows decryption of past content. The present invention can be used in such scenarios to cure the lack of backwards secrecy by including, in the set of revoked receivers, all receiver identities that have not yet been assigned. This can be done if all receivers are assigned to leaves in consecutive order. In this case, revocation of all unassigned identities results in a moderate increase in message header size, but not proportionally to the number of such identities.

The present invention also recognizes that it is desirable to have concise encodings of the subsets $i_j$ in the message header and to provide a quick way for a receiver to determine whether it belongs to a subset $i_j$. Assume that a node is denoted by its path to the root, with 0 indicating a left branch and 1 indicating a right branch. The end of the path is denoted by a 1 followed by zero or more 0 bits. Thus, the root is 1000 . . . 000b, the rightmost child of the root is 01000 . . . 000b, the leftmost child is 11000 . . . 000b, and a leaf is xxxx . . . xxxx1b.

As recognized herein, the path of a larger subtree's root is a subset of the path of a smaller subtree's root, so that the subset difference can be denoted by the root of the smaller subtree plus the length of the path to the larger subtree's root. With this in mind, a receiver can quickly determine if it is in a given subset by executing the following Intel Pentium® processor loop.

Outside the loop, the following registers are set up: ECX contains the receiver's leaf node, ESI points to the message buffer (the first byte is the length of the path to the larger subtree root and the next four bytes are the root of the smaller tree), and a static table outputs 32 bits when indexed by the length of the path, with the first length bits being 1 and the remaining bits being 0.

```
loop:  MOV BYTE EBX, [ESI++]
       MOV DWORD EAX, [ESI++]
       XOR EAX, ECX
          AND EAX, TABLE[EBX]
       JNZ loop
```

If a receiver falls out of the loop, it does not necessarily mean that it belongs to the particular subset. It might be in the smaller excluded subtree, and if so, it must return to the loop. However, since in the vast majority of cases the receiver is not even in the larger subtree, almost no processing time is spent in the loop.

In a further optimization of the subset difference method, the system server does not have to remember each and every label, which could run into the millions. Instead, the label of the $i^{th}$ node can be a secret function of the node. The secret function could be a triple DES encryption that uses a secret key to render the label of the $i^{th}$ node when applied to the number i.

While the particular METHOD FOR BROADCAST ENCRYPTION AND KEY REVOCATION OF STATELESS RECEIVERS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A method comprising:
  supplying each user in a group of users respective private information $I_u$;
  selecting at least one session encryption key K;
  at least in part using a processor accessing a non-transitory storage medium, partitioning users not in a revoked set R of revoked receivers into disjoint subsets $S_{i1}, \ldots S_{im}$ having associated subset keys $L_{i1}, \ldots L_{im}$;
  encrypting the session key K with the subset keys $L_{i1}, \ldots, L_{im}$ to render m encrypted versions of the session key K, wherein each user deduces at least one subset key using its private information;
  identifying subsets of users using at least one of: (a) a subset difference routine wherein respective groups of users correspond to a universe of sets $S_1, \ldots, S_w$ that is described as "a first subtree A minus a second subtree B that is entirely contained in A" with each node in the tree having a set of labels, one unique to the node and others that are induced by ancestor nodes and with each user being assigned labels from all nodes hanging from nodes in a direct path between the user and the root but not from nodes in the direct path itself, or (b) a complete subtree routine wherein respective subsets correspond to all possible subtrees in a complete tree and each user is assigned keys from all nodes that are in a direct path between a leaf representing the user and the root of the tree, wherein the complete subtree routine includes defining a spanning tree having leaves established by the revoked set R of revoked receivers, the spanning tree being a subtree of a tree connecting leaves corresponding to revoked receivers, subtrees having roots adjacent to nodes of degree one of the spanning tree establishing subsets $S_{i1}, \ldots, S_{im}$ encompassing all non-revoked receivers.

2. The method of claim 1, further comprising partitioning the users into groups $S_1, \ldots, S_w$, wherein "w" is an integer, and the groups establish subtrees in a tree.

3. The method of claim 2, wherein the tree is a complete binary tree.

4. The method of claim 1, further comprising using private information $I_u$ to decrypt the session key.

5. The method of claim 2, wherein each subset $S_{i1}, \ldots S_{im}$ includes all leaves in a subtree rooted at some node $v_i$, at least each node in the subtree being associated with a respective subset key.

6. The method of claim 5, wherein each user must store log N keys, wherein N is the total number of users.

7. The method of claim 5, wherein the revoked set R defines a spanning tree, and subtrees having roots attached to nodes of the spanning tree define the subsets.

8. The method of claim 2, wherein the tree includes a root and plural nodes, each node having at least one associated label, and wherein each subset includes all leaves in a subtree rooted at some node $v_i$ that are not in the subtree rooted at some other node $v_j$ that descends from $v_i$.

9. The method of claim 2, wherein the tree includes a root and plural nodes, each node having an associated key, and wherein each user is assigned keys from all nodes in a direct path between a leaf representing the user and the root.

10. A computer program device, comprising:
  a computer program storage device including a program of instructions usable by a computer, comprising:
  logic means, including at least one of: a subset difference routine wherein the subset difference routine is described at least in part by "a first subtree A minus a second subtree B that is entirely contained in A" with at least some nodes of one or more of the subtrees having at least one or more labels and with at least some users being assigned labels from all nodes hanging from nodes in a direct path between the user being assigned labels and the root but not from nodes in the direct path itself, and a complete subtree routine, for accessing a tree to identify plural subset keys, wherein the complete subtree routine includes defining a spanning tree having leaves established by a revoked set R of revoked receivers, the spanning tree being a subtree of a tree connecting leaves corresponding to revoked receivers, subtrees having roots adjacent to nodes of degree one of the spanning tree establishing subsets $S_{i1}, \ldots, S_{im}$ encompassing all non-revoked receivers;
  logic means for encrypting a message with a session key;
  logic means for encrypting the session key at least once with each of the subset keys to render encrypted versions of the session key; and
  logic means for sending the encrypted versions of the session key in a header of the message to plural stateless receivers.

11. The computer program device of claim 10, further comprising:
  logic means for partitioning receivers not in a revoked set R into disjoint subsets $S_{i1}, \ldots S_{im}$ having associated subset keys $L_{i1}, \ldots, L_{im}$.

12. The computer program device of claim 11, further comprising logic means for partitioning the users into groups $S_1, \ldots, S_w$, wherein "w" is an integer, and the groups establish subtrees in a tree.

13. The computer program device of claim 10, further comprising logic means for using private information $I_u$ to decrypt the session key.

14. The computer program device of claim 13, wherein the means for decrypting includes logic means for using information $i_j$ such that a receiver belongs to a subset $S_{ij}$, and retrieving a key $L_{ij}$ from the private information of the receiver.

15. The computer program device of claim 12, wherein each subset $S_{i1}, \ldots S_{im}$ includes all leaves in a subtree rooted at some node $v_i$, at least each node in the subtree being associated with a respective subset key.

16. The computer program device of claim 15, wherein each receiver must store log N keys, wherein N is the total number of receivers.

17. The computer program device of claim 15, wherein the revoked set R defines a spanning tree, and subtrees having roots attached to nodes of the spanning tree define the subsets.

18. The computer program device of claim 12, wherein the tree includes a root and plural nodes, each node having at least one associated label, and wherein each subset includes all leaves in a subtree rooted at some node $v_i$ that are not in the subtree rooted at some other node $v_j$ that descends from $v_i$.

19. The computer program device of claim 12, wherein the tree includes a root and plural nodes, each node having an associated key, and wherein logic means assign each receiver keys from all nodes in a direct path between a leaf representing the receiver and the root.

20. A computer programmed with instructions carried on a non-transitory computer readable storage medium to cause the computer to:
encrypt broadcast content by executing a complete subtree routine or a subset difference routine wherein respective groups of users correspond to a universe of sets $S_1, \ldots, S_w$ described as "a first subtree A minus a second subtree B that is entirely contained in A" with each node in the tree having a set of labels, one unique to the node and others that are induced by ancestor nodes and with each user being assigned labels from all nodes hanging from nodes in a direct path between the user and the root but not from nodes in the direct path itself, wherein the complete subtree routine includes defining a spanning tree having leaves established by a revoked set R of revoked receivers, the spanning tree being a subtree of a tree connecting leaves corresponding to revoked receivers, subtrees having roots adjacent to nodes of degree one of the spanning tree establishing subsets $S_{i1}, \ldots, S_{im}$ encompassing all non-revoked receivers; and
send the encrypted broadcast content to plural stateless receivers and to at least one revoked receiver such that each stateless receiver decrypts the content and the revoked receiver cannot decrypt the content.

21. The computer of claim 20, wherein the computer assigns each receiver in a group of receivers respective private information $I_u$;
selects at least one session encryption key K;
partitions all receivers not in a revoked set R into disjoint subsets $S_{i1}, \ldots S_{im}$ having associated subset keys $L_{i1}, \ldots, L_{im}$; and
encrypts the session key K with the subset keys $L_{i1}, \ldots, L_{im}$ to render m encrypted versions of the session key K.

22. The computer of claim 20, wherein the computer partitions the users into groups $S_1, \ldots, S_w$, wherein "w" is an integer, and the groups establish subtrees in a tree.

23. The computer of claim 22, wherein the tree is a complete binary tree.

24. The computer of claim 23, wherein the computer uses information such that a receiver belongs to a subset $S_{ij}$, and retrieves a key $L_{ij}$ using the private information of the receiver.

25. The computer of claim 22, wherein each subset $S_{i1}, \ldots S_{im}$ includes all leaves in a subtree rooted at some node $v_i$, at least each node in the subtree being associated with a respective subset key.

26. The computer of claim 25, wherein each receiver must store log N keys, wherein N is the total number of receivers.

27. The computer of claim 25, wherein the revoked set R defines a spanning tree, and subtrees having roots attached to nodes of the spanning tree define the subsets.

28. The computer of claim 22, wherein the tree includes a root and plural nodes, each node having at least one associated label, and wherein each subset includes all leaves in a subtree rooted at some node $v_i$ that are not in the subtree rooted at some other node $v_j$ that descends from $v_i$.

29. The computer of claim 28, wherein content is provided to receivers in at least one message defining a header, and the header includes at most 2r−1 subset keys and encryptions, wherein r is the number of receivers in the revoked set R.

30. The computer of claim 28, wherein each receiver must store $0.5 \log^2 N + 0.5 \log N + 1$ keys, wherein N is the total number of receivers.

31. The computer of claim 28, wherein content is provided to receivers in at least one message, and wherein each receiver processes the message using at most log N operations plus a single decryption operation, wherein N is the total number of receivers.

32. The computer of claim 28, wherein the revoked set R defines a spanning tree, and wherein the computer further:
Initializes a cover tree T as the spanning tree;
iteratively removes nodes from the cover tree T and adding nodes to a cover until the cover tree T has at most one node.

33. The computer of claim 32, wherein the computer assigns node labels to receivers from the tree using a pseudorandom sequence generator.

34. The computer of claim 33, wherein the computer evaluates the pseudorandom sequence generator.

35. The method of claim 8, wherein each node has plural labels with each ancestor of the node inducing a respective label, and wherein each user is assigned labels from all nodes hanging from a direct path between the user and the root but not from nodes in the direct path.

36. A method for broadcast encryption, comprising:
assigning each user in a group of users respective private information $I_u$;
selecting at least one session encryption key K;
using a processor accessing a computer-readable storage medium, partitioning all users into groups $S_1, \ldots, S_w$, wherein "w" is an integer greater than one, and the groups establish subtrees in a tree;
partitioning users not in a revoked set R into disjoint subsets $S_{i1}, \ldots S_{im}$ having associated subset keys $L_{i1}, \ldots L_{im}$, wherein "I" is an integer equal to or greater than one and "m" is an integer greater than one; and
encrypting the session key K with the subset keys $L_{i1}, \ldots, L_{im}$ to render m encrypted versions of the session key K, wherein the tree includes a root and plural nodes, each node having at least one associated label, and wherein each subset includes all leaves in a subtree rooted at some node $v_i$ except for leaves of a subtree rooted at some other node $v_j$ that descends from $v_i$.

37. A receiver of content, comprising:
computer readable storage storing respective private information $I_u$;
processor receiving at least one session encryption key K encrypted with plural subset keys, the session key encrypting content; and
the processor obtaining at least one subset key using the private information such that the session key K is decryptable to play the content, wherein the receiver is partitioned into one of a set of groups $S_1, \ldots, S_w$, wherein "w" is an integer, and the groups establish subtrees in a tree defining nodes and leaves, wherein subsets $S_{i1}, \ldots, S_{im}$ derived from the set of groups $S_1, \ldots, S_w$ define a cover of non-revoked receivers, wherein a revoked set R of revoked receivers defines a spanning tree, and subtrees having roots attached adjacent to nodes of the spanning tree define the cover.

38. The receiver of claim 37, wherein the receiver receives content in at least one message defining a header, and the header includes at most r*log(N/r) subset keys and encryptions, wherein r is the number of receivers in a revoked set R and N is the total number of receivers.

39. The receiver of claim 37, wherein the receiver must store log N keys, wherein N is the total number of receivers.

40. The receiver of claim 37, wherein the receiver receives content in at least one message defining a header, and wherein the receiver processes the message using at most log N operations plus a single decryption operation, wherein N is the total number of receivers.

41. A receiver of content, comprising:
a data storage storing respective private information $I_u$;
a processing device receiving at least one session encryption key K encrypted with plural subset keys, the session key encrypting content, the processing device obtaining at least one subset key using the private information such that the session key K is decryptable to play the content, wherein the receiver is partitioned into one of a set of groups $S_1, \ldots, S_w$, wherein "w" is an integer greater than one, and the groups establish subtrees in a tree, wherein the tree includes a root and plural nodes, each node having at least one associated label, and wherein users that are not revoked are partitioned into subsets and further wherein each subset includes all leaves in a subtree rooted at some node $v_i$ except for leaves of a subtree rooted at some other node $v_j$ that descends from $v_i$.

42. The receiver of claim 41, wherein the receiver receives content in at least one message defining a header, and the header includes at most r*log(N/r) subset keys and encryptions, wherein r is the number of receivers in a revoked set R and N is the total number of receivers.

43. The receiver of claim 41, wherein the receiver must store log N keys, wherein N is the total number of receivers.

44. The receiver of claim 41, wherein the receiver receives content in at least one message defining a header, and wherein the receiver processes the message using at most log N operations plus a single decryption operation, wherein N is the total number of receivers.

45. The receiver of claim 41, wherein one revoked set R defines a spanning tree, and subtrees having roots attached to nodes of the spanning tree define the subsets.

46. The computer of claim 21, wherein a system computer in a system of receivers separate from the system computer partitions the receivers.

47. The computer of claim 21, wherein a receiver computer partitions the receivers.

48. The receiver of claim 37, wherein the receiver derives the subsets in the cover.

49. The computer of claim 20, wherein a receiver uses private information $I_u$ to decrypt the session key.

* * * * *